United States Patent
Nitta et al.

(10) Patent No.: US 11,909,925 B2
(45) Date of Patent: Feb. 20, 2024

(54) INFORMATION PROCESSING APPARATUS AND METHOD OF DETECTING MALFUNCTION IN DATA COMMUNICATION

(71) Applicants: Nobuyuki Nitta, Kanagawa (JP); Ryuuichi Satoh, Kanagawa (JP)

(72) Inventors: Nobuyuki Nitta, Kanagawa (JP); Ryuuichi Satoh, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 18/137,096

(22) Filed: Apr. 20, 2023

(65) Prior Publication Data
US 2023/0396718 A1    Dec. 7, 2023

(30) Foreign Application Priority Data

Jun. 1, 2022  (JP) ................. 2022-089768
Mar. 24, 2023  (JP) ................. 2023-047807

(51) Int. Cl.
H04N 1/00    (2006.01)

(52) U.S. Cl.
CPC ..... *H04N 1/00084* (2013.01); *H04N 1/00037* (2013.01); *H04N 1/00938* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2003/0214678 A1* | 11/2003 | Shibata | H04N 1/32609 358/405 |
| 2010/0225969 A1 | 9/2010 | Sato | |
| 2015/0109635 A1* | 4/2015 | Takatani | G06F 3/1221 358/1.14 |
| 2020/0073454 A1 | 3/2020 | Saito et al. | |

FOREIGN PATENT DOCUMENTS

| | | |
|---|---|---|
| JP | 2003-333271 | 11/2003 |
| JP | 2019-161589 | 9/2019 |

* cited by examiner

*Primary Examiner* — Thomas D Lee
(74) *Attorney, Agent, or Firm* — Duft & Bornsen, PC

(57) ABSTRACT

An information processing apparatus, an image forming apparatus, an information processing method, and a non-transitory recording medium. The information processing apparatus in response to completion of a specific software activation process in the controller, transmits an activation completion notification to the operation device and the operation device in response to receiving the activation completion notification, updates a timeout period of a timer started after activation of software of the operation device to a shorter period of time and restart the timer, and in a case data communication is not established on the communication path within the updated timeout period, detects a malfunction and notifies the controller of the malfunction, and the controller performs a recovery process.

6 Claims, 6 Drawing Sheets

INFORMATION PROCESSING APPARATUS AND METHOD OF DETECTING MALFUNCTION IN DATA COMMUNICATION

CROSS-REFERENCE TO RELATED APPLICATIONS

This patent application is based on and claims priority pursuant to 35 U.S.C. § 119(a) to Japanese Patent Application No. 2022-089768, filed on Jun. 1, 2022, and No. 2023-047807, filed on Mar. 24, 2023, in the Japan Patent Office, the entire disclosure of which is hereby incorporated by reference herein.

BACKGROUND

Technical Field

The present disclosure relates to an information processing apparatus, an image forming apparatus, an information processing method, and a non-transitory recording medium.

Related Art

An information processing apparatus including a controller for controlling the entire apparatus and an operation device that is an external device of the controller connected to the controller starts a malfunction detection timer after the power is turned on, and determines whether data communication (Universal Serial Bus (USB) communication) is available by connecting to the operation device through a USB cable.

Then, when the data communication is not available and a count value of the malfunction detection timer reaches or exceeds a fixed count value, the controller determines that there is a malfunction in the operation device. The fixed count value (time) of the malfunction detection timer is defined as a timeout period.

SUMMARY

Embodiments of the present disclosure describe an information processing apparatus, an image forming apparatus, an information processing method, and a non-transitory recording medium. The information processing apparatus in response to completion of a specific software activation process in the controller, transmits an activation completion notification to the operation device and the operation device in response to receiving the activation completion notification, updates a timeout period of a timer started after activation of software of the operation device to a shorter period of time and restart the timer, and in a case data communication is not established on the communication path within the updated timeout period, detects a malfunction and notifies the controller of the malfunction, and the controller performs a recovery process.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
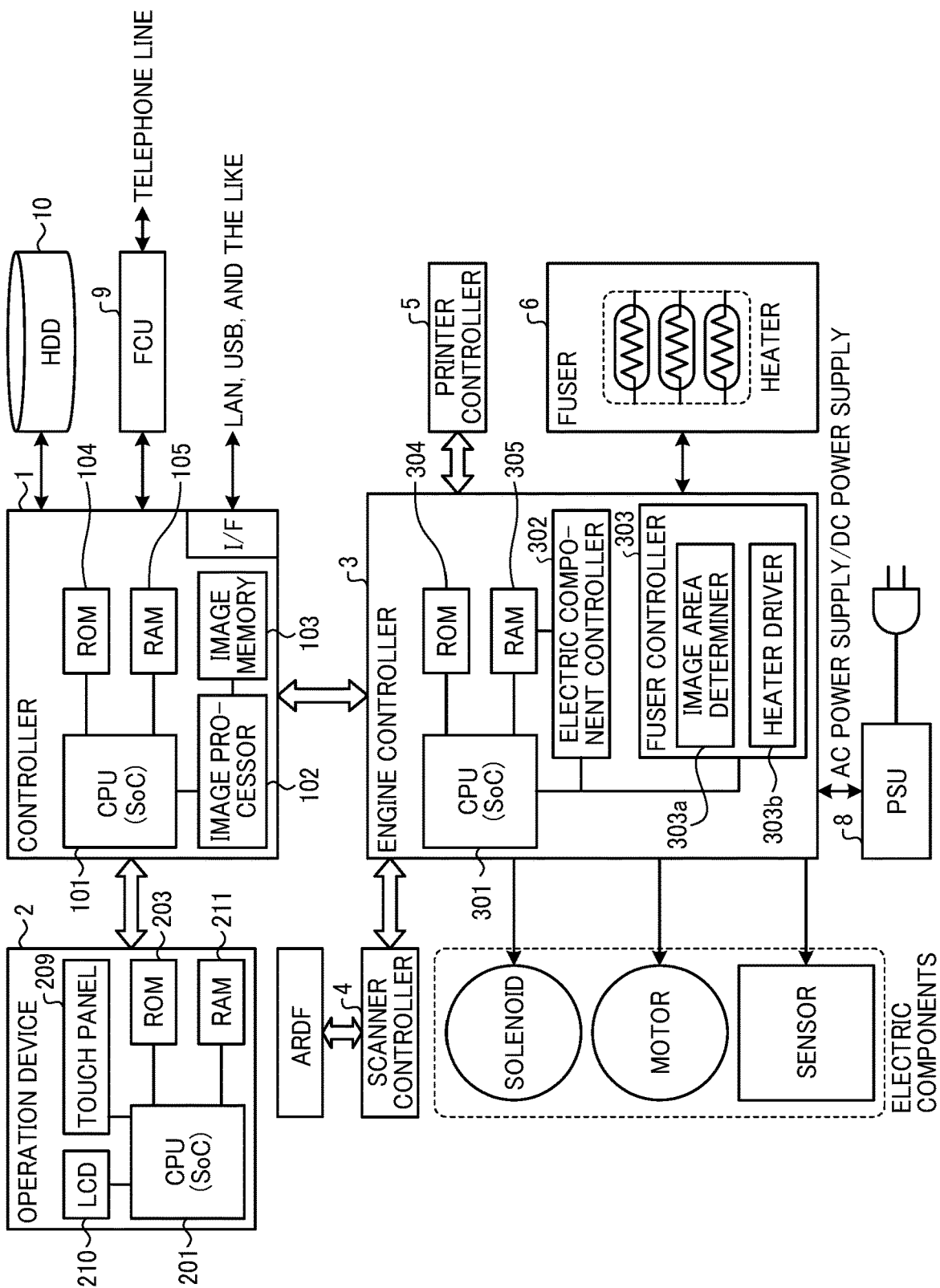
FIG. 1 is a block diagram illustrating an example of an overall configuration of a multifunction peripheral (MFP) according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of several embodiments of an information processing apparatus, an image forming apparatus, an information processing method, and a non-transitory recording medium.

FIG. 1 is a block diagram illustrating an example of an overall configuration of an MFP according to embodiments of the present disclosure. The MFP according to the present embodiment includes a controller 1, an operation device 2, an engine controller 3, a scanner controller 4, a printer controller 5, a fuser 6, a power supply unit (PSU) 8, an image processor, and the like. In the present embodiment, the MFP is an example of an image forming apparatus or an information processing apparatus.

The controller 1 receives instruction of an image forming operation by the MFP and controls the image forming operation. Further, the controller 1 controls image forming, user interface and mode setting, application control such as copying and printing, and the like.

Specifically, the controller 1 includes a central processing unit (CPU) 101, image processor 102, image memory 103, Read Only Memory (ROM) 104, Random Access Memory (RAM) 105 which is a nonvolatile random access memory (NVRAM), and the like.

The CPU 101 performs various processing operations. The controller 1 may include a system on a chip (SoC) instead of the CPU 101.

The image processor 102 is mainly implemented by an Application Specific Integrated Circuit (ASIC) or the like that performs image formation. The image memory 103 is a memory used for processing image data. The ROM 104 is a memory that permanently stores a control program. The RAM 105 is a memory that temporarily stores various information.

The controller 1 may be provided with the NVRAM or the like for storing setting information of all operating conditions of the MFP. The NVRAM is connected to a local area network (LAN) interface for transmitting and receiving information from an external communication device through a LAN and the like, an operation device controller that serves as a user interface, and a hard disk drive (HDD) 10 that stores predetermined (processed) data.

The MFP also includes an interface for communicating with a facsimile control unit (FCU) 9, which is a facsimile, an engine controller and the like which are connected to the controller 1 through a PCI bus. The controller 1 receives an instruction of an image forming operation from the operation device 2 or the external device through a LAN interface, executes the image forming operation, and transmits a created image to the engine controller 3 through a Peripheral Component Interconnect (PCI) bus.

The engine controller 3 is an engine control system for controlling driving of a printer engine provided in the MFP. The engine controller 3 and the printer engine implement an image forming device that forms an image. The engine controller 3 includes a CPU 301, an electric component controller 302, a fuser controller 303, a ROM 304 and a RAM 305. The CPU 301 mainly performs various processing operations. The electric component controller 302 is an ASIC or the like that controls various electrical components. The fuser controller 303 monitors fuser temperature and controls a heater. The RAM 305 temporarily stores various information. The ROM 304 permanently stores a control program.

The fuser controller 303 includes an image area determiner 303a and a heater driver 303b. The image area determiner 303a determines an image area from image information received from the controller 1. The heater driver 303b determines whether to drive each of a plurality of heaters of the fuser 6 for the image area determined by the image area determiner 303a, and turns on the heaters. The fuser controller 303 also includes a heater temperature monitoring function as a sensor for monitoring the temperature of the heater.

In the scanner controller 4, a scanner board unit (SBU), which performs scanner input and output control or image transfer, controls electric components such as motors, so that the image on the paper set by the user is read by a charge coupled device (CCD) or the like. The read image is transmitted through the engine controller 3 to the image processor 102 of the controller 1 through the PCI bus. The printer controller 5 transmits the image data sent from the controller 1 or the scanner controller 4 through the PCI bus to a laser diode (LD) unit or a light emitting diode (LED) unit that performs image formation, thereby writing a pattern on the paper to perform printing or copying.

After the image read by the scanner controller 4 is sent to the controller 1, the controller 1 transfers the image to a personal computer or the like through a LAN interface, thereby performing a scanner operation.

The fuser 6 is a fusing unit including a plurality of heaters, and includes a plurality of heating elements such as thermal heads provided in a main scanning direction.

The operation device 2 receives operations from the user. The operation device 2 includes a CPU 201, a ROM 203, a RAM 211, a touch panel 209, a liquid crystal display (LCD) 210, and the like.

Figure 2:
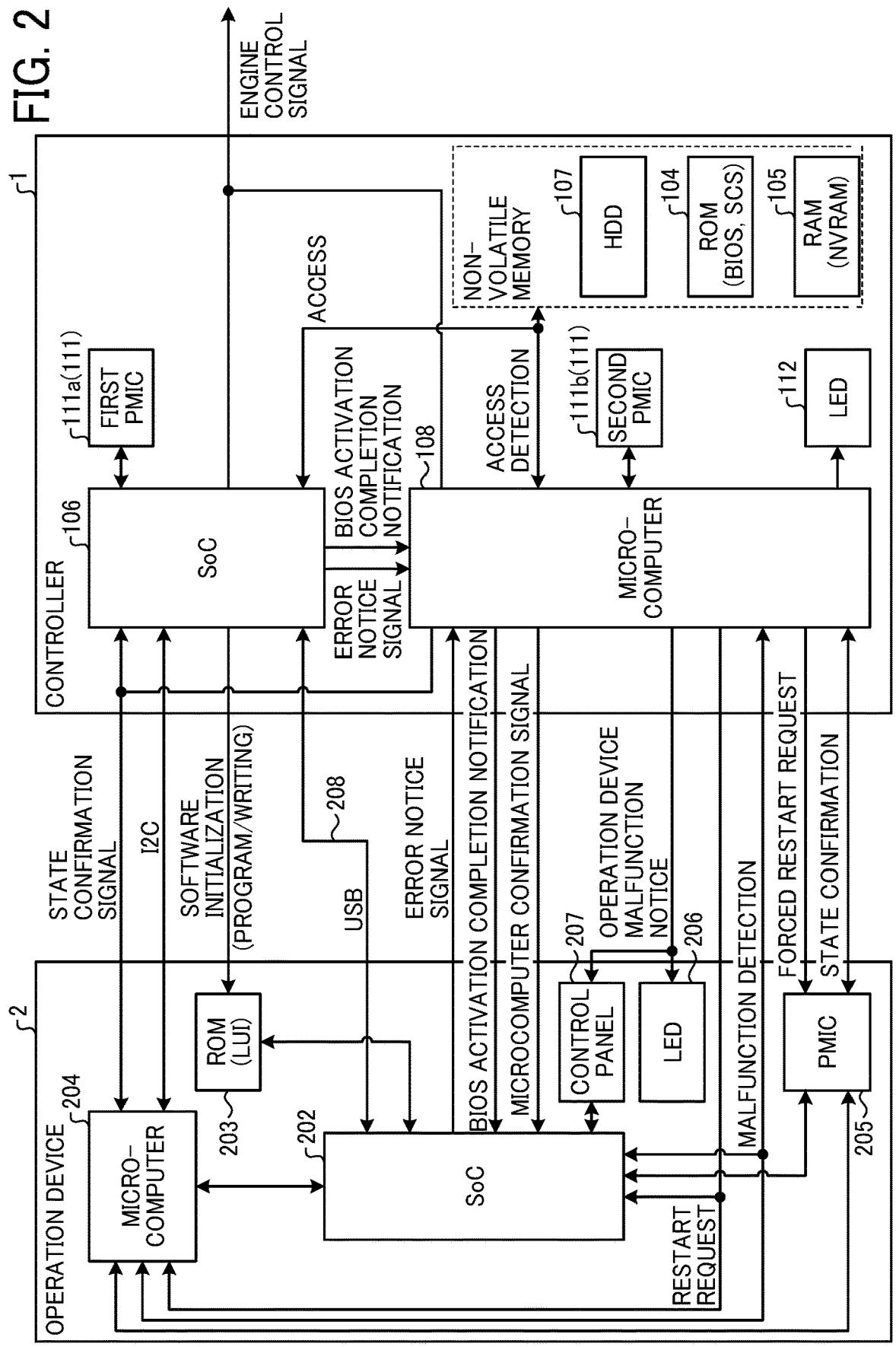
FIG. 2 is a diagram illustrating an example of a detailed configuration of a controller and an operation device included in the MFP according to the embodiments of the present disclosure.

FIG. 2 is a diagram illustrating an example of a detailed configuration of the controller and the operation device included in the MFP according to the embodiments of the present disclosure.

As illustrated in FIG. 2, the MFP according to the present embodiment includes the controller 1 and the operation device 2, which is an external device, connected to the controller. The connection between the controller 1 and the operation device 2 may be a wired connection using a signal line for serial communication, or a wireless connection such as a wireless LAN.

The interface for connection is not limited. For example, in addition to the signal line for serial communication, wired or wireless LAN, BLUETOOTH (registered trademark), Infrared Data Association (IrDA), Wireless Fidelity (Wi-Fi (registered trademark)) and the like may be used.

Any communication method may be used, for example, Inter-Integrated Circuit (I2C) communication may be used.

The controller 1 controls an overall processing operation of the MFP. Specifically, the controller 1 receives a print request from an external personal computer (PC) or the operation device 2, and controls the entire machine accordingly. In an example of the image forming apparatus, the controller 1 is connected to the engine.

The controller 1 includes an SoC 106, an HDD 107, a ROM 104, a RAM 105, a microcomputer 108, a power management integrated circuit (PMIC) 111, and an LED 112.

The SoC 106 is an arithmetic unit including the CPU 101 (an example of a first arithmetic unit) and various bus functions, and is connected to each component of the controller 1 to perform overall control of the controller 1. The SoC 106 executes a basic input output system (BIOS) and programs (for example, single console support (SCS)) stored in the ROM 104 based on data stored in the HDD 107 (for example, backup of print data), user settings stored in the RAM 105, and the like. The CPU 101 of the SoC 106 serves as an example of a first notification unit for notifying the microcomputer 108 of startup completion (for example, BIOS startup completion) when specific software processing (for example, BIOS startup processing) is completed during startup of the MFP. The HDD 107, the ROM 104, and the RAM 105 are storage devices, and may be a nonvolatile memory or the like. The SoC 106 communicates with the engine of the image forming apparatus which is the information processing apparatus.

The microcomputer 108 (an example of a first control unit) controls power supply and restoration of the controller 1. The microcomputer 108 is connected to the SoC 106 and communicates with each other. The microcomputer 108 receives a notification of completion of software activation (for example, completion of BIOS activation) from the SoC 106, and functions as an example of a second notification unit that notifies the SoC 202 (the CPU 201 that is an example of a second arithmetic unit) of the operation device 2 that the software has been activated. In the present embodiment, a notification signal indicating the completion of software activation (for example, BIOS activation completion) is notified to the operation device 2 through the microcomputer 108, but the SoC 106 may directly transmit the notification signal. Further, when the operation device 2 detects a malfunction in data communication between the controller 1 and the operation device 2 (for example, a malfunction of the controller 1), the microcomputer 108 receives notification of the malfunction from the operation device 2. The microcomputer 108 receives the malfunction notification and performs a recovery process such as restarting of the entire apparatus or indication of an error.

The PMIC 111 controls power supply of the controller 1. The PMIC 111 includes a first PMIC 111a connected to the SoC 106 and a second PMIC 111b connected to the microcomputer 108.

The LED 112 functions as a notification unit for giving notification in the controller 1.

The operation device 2 is configured as a device for operating the controller 1, for example, for receiving an input according to a user's operation. That is, the operation device 2 receives operation from the user and displays a state of the MFP. The operation device 2 is connected to the controller 1 through a USB cable 208, which is an example of a communication path. Specifically, the USB cable 208 is a communication path for data communication between the SoC 106 (CPU 101) and the SoC 202 (CPU 201). Furthermore, the operation device 2 is connected to the controller 1 through a signal line (communication path) independent of the USB cable 208.

The operation device 2 includes the SoC 202, a ROM 203, a microcomputer 204, a PMIC 205, an LED 206 and a control panel 207.

The SoC 202 is an arithmetic unit including the CPU 201 (an example of the second arithmetic unit) and various bus functions, and is connected to each component of the operation device 2 to control the operation device 2 as a whole. The SoC 202 executes programs (for example, local user interface (LUI)) stored in the ROM 203. The ROM 203 is a nonvolatile memory or the like. The SoC 202 is connected to the SoC 106 of the controller 1 and the microcomputer 108. The SoC 202 is capable of mutual communication with the microcomputer 108 and the SoC 106. In the present embodiment, the connection between the SoC 202 and the SoC 106 of the controller 1 includes a USB connection using the USB cable 208.

The SoC 202 includes the CPU 201 that controls the operation device 2. After starting the LUI, the SoC 202 (CPU 201) attempts to connect to the controller 1, and in the case the connection is not established for a certain period of time, determines that a malfunction has occurred. Specifically, after starting the LUI, the CPU 201 starts the malfunction detection timer (an example of a timer) and in the case a timeout indicating that the communication is not established through the USB cable 208 within the timeout period of the malfunction detection timer, functions as an example of detection unit for detecting a malfunction in data communication through the USB cable 208 (for example, a problem in the controller 1). Then, the CPU 201 functions as an example of a third notification unit for notifying the microcomputer 108 of the controller 1 of the result (malfunction notification) in the case the malfunction occurs in a communication path different from the USB cable 208.

At that time, the CPU 201 controls to dynamically switch the time-out period for determining the malfunction in the USB cable 208. Specifically, the CPU 201 functions as an example of restart unit for updating the timeout period and restarting the malfunction detection timer in response to receiving the notification of completion of BIOS activation from the microcomputer 108. According to a system in which the operation device 2 determines whether data communication with the controller 1 is available, by detecting a malfunction when the completion of connection with the controller 1 is not confirmed within a certain period of time after starting the LUI, since the timeout period is dynamically switched when detecting the malfunction in the USB cable 208, even when there is variation in the start-up time of the controller 1, especially the time until BIOS activation, the time until malfunction detection in the operation device 2 is minimized.

In the present embodiment, the CPU 201 sets a specific timeout period as an initial value in response to the activation of the LUI. In response to receiving the notification of the completion of the BIOS activation, the CPU 201 resets the timeout period to a time shorter than the initial value, and restarts the malfunction detection timer.

The ROM 203 stores a program for operating the operation device 2. The ROM 203 is connected to the SoC 106 of the controller 1, and initializes software (writes program) under the control of the SoC 106.

The microcomputer 204 controls the power supply and restoration of the operation device 2. The microcomputer 204 is connected to the SoC 202 and communicates with each other. The microcomputer 204 is connected to the SoC 106 and the microcomputer 108 of the controller 1 and is capable of mutual communication with the microcomputer 108 and the SoC 106.

The PMIC 205 controls the power supply of the operation device 2. The PMIC 205 is connected to the SoC 202 and the microcomputer 204. The PMIC 205 of the present embodiment is a direct current to direct current (DC/DC) converter. The PMIC 205 is connected to the microcomputer 108 of the controller 1 and is capable of mutual communication with the microcomputer 108. According to the present embodiment, the microcomputer 108 confirms the operating state of the PMIC 205. The PMIC 205 receive a restart request signal from the microcomputer 108.

The LED 206 functions as a notification unit that notifies the operation device 2. The LED 206 is connected to the microcomputer 108 of the controller 1 and receives a notification signal from the microcomputer 108.

The control panel 207 includes an input unit (touch panel 209) for receiving operations, and a display unit (LCD) 210 for displaying information. The input unit includes a touch screen, hardware keys, and the like. The touch screen is, for example, a liquid crystal display (LCD) or an organic electro luminescence (EL) display equipped with a touch panel function. Accordingly, the touch screen functions as an input unit and a display unit. In the case the input unit includes hardware keys, the display unit is provided separately from the hardware keys. The input unit may include a keyboard, a mouse, a microphone that supports voice input, and a camera that supports gesture input. The control panel 207 may be provided with a speaker for notifying the user of the device status and the like. In other words, the control panel 207 functions as a notification unit for making notification in the operation device 2. Further, the LED 206 described above may be included as a function of the control panel 207. The control panel 207 is connected to the microcomputer 108 of the controller 1 and receives notification signals from the microcomputer 108.

Figure 3:
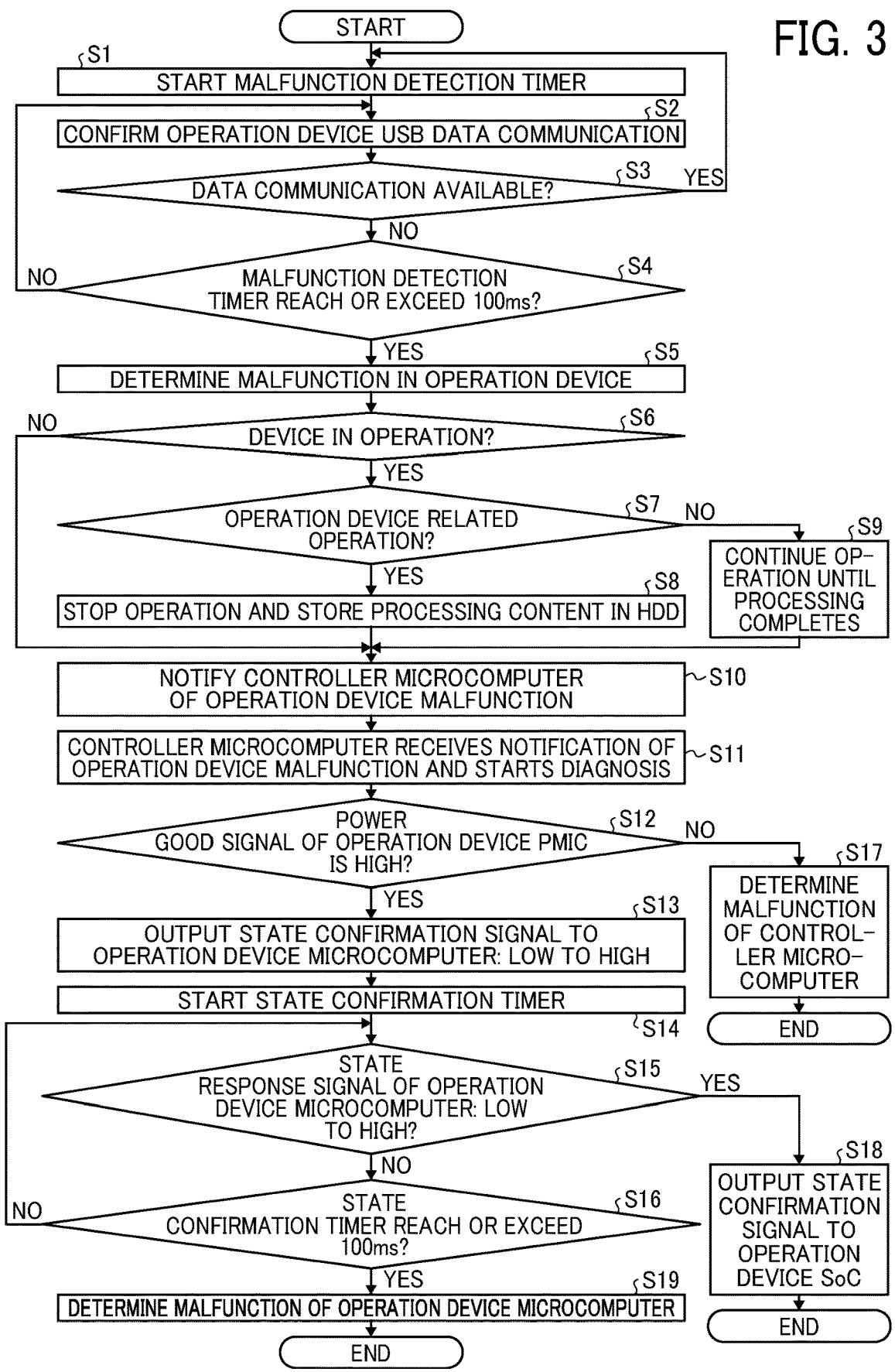
FIG. 3 is a flowchart illustrating an example of operation of a conventional MFP.

FIG. 3 is a flowchart illustrating an example of operation of a conventional MFP.

The SoC 202 of the operation device 2 starts a malfunction detection timer in step S1, confirm whether data communication is available in the connection with the controller 1 through the USB cable 208 in step S2, and determines whether the data communication is available in step S3, based on the confirmation result of data communication in step S2. In response to determination that the data communication is available in step S3 (step S3: Yes), the SoC 202 resets the malfunction detection timer and repeats steps S1, S2, and S3. On the other hand, in response to determination that the data communication is not available in step S3 (step S3: No) and the malfunction detection timer started in step S1 is less than the timeout period (for example, 100 ms) (step S4: No), the SoC 202 continues the malfunction detection timer, and returns the process to steps S2 and S3 to confirm the data communication.

In the case the data communication is not available (step S3: No) and the malfunction detection timer started in step S1 reaches or exceeds the timeout period (for example, 100 ms) (step S4: Yes), the SoC 202 determines that a malfunction occurred, and malfunction information indicating the malfunction is acquired in step S5. Note that the malfunction may be, for example, hardware oriented, software oriented, cable disconnection, and the like, but not specified at this stage. Also, the timeout period in step S4 can be set at any period.

In step S6, the SoC 202 determines whether the device (the image forming apparatus in the present embodiment) to which the operation device 2 is connected is in operation. Based on determination that the device is in operation (step S6: Yes) and that the operation is a related operation of the operation device 2 (step S7: Yes), the SoC 202 stops the operation of the device and saves the operation contents in the HDD 107 in step S8. Based on determination that the device is in operation (step S6: Yes) and that the operation is not related to the operation device 2 (step S7: No), the SoC 202 continues the operation of the device and completes the operation in step S9. For example, a network print operation in the image forming apparatus is not related to the operation of the operation device 2, and in such a case, the printing operation is performed without using the operation device 2. For example, printing data from a Secure Digital (SD) memory card or USB memory connected to the operation device 2 is a related operation of the operation device 2, and in such a case, printing is disabled unless the operation device 2 operates normally. In step S6, based on determination that the device is not in operation (step S6: No), the process proceeds to step S10.

In step S10, the SoC 202 notifies the microcomputer 108 of the malfunction of the operation device 2. In step S11, the microcomputer 108 recognizes the malfunction of the operation device 2 and starts diagnosing cause of the malfunction (health check). In diagnosing the cause of malfunction, the microcomputer 108 requests and receives a Power Good signal from the PMIC 205 of the operation device 2, and determines whether the Power Good signal is high (above a predetermined range of the output voltage setting value). In step S12, based on determination that the Power Good signal is not high (step S12: No), the microcomputer 108 of the controller 1 determines that there is a malfunction.

In step S12, based on determination that the Power Good signal is high (step S12: Yes), the microcomputer 108 outputs a state control signal low to high as a state confirmation signal to the microcomputer 204 of the operation device 2 through General Purpose Input Output (GPIO) in step S13, starts a state confirmation timer in step S14, and the microcomputer 204 of the operation device 2 confirms whether the state response signal is changed from low to high as the state control signal in step S15. In step S15, based on determination that the state response signal did not change from low to high (step S15: No), and the state confirmation timer started in step S14 reaches or exceeds 100 ms (step S16: Yes), the microcomputer 108 determines that a malfunction occurred in the microcomputer 204 of the operation device 2. Further, in step S15, based on determination that the state response signal did not change from low to high (step S15: No), and the state confirmation timer started in step S14 is not reaching 100 ms (step S16: No), the state confirmation timer continues to count and the process returns to step S15. In step S15, based on determination that the state response signal is changed from low to high (step S15: Yes), the state confirmation signal is output to the SoC 202 of the operation device 2.

As described above, in the MFP according to the present embodiment, the operation device 2, which is an external device, is connected to the controller 1 through the USB cable 208 or the like. In the present embodiment, the controller 1 and the operation device 2 are connected through the USB cable 208, but data communication error such as interruption of the data communication for some reason, or no response to a command output from one of the controller 1 or the operation device 2 may occur. Since the MFP does not operate normally with the data communication malfunction, an action to solve malfunction such as restart or notifying a user or a technician of the malfunction is performed. The malfunction of data communication often occurs at a time when a processing load is high, such as when the MFP is started. In such case, implementing the restart process as soon as possible is preferred for convenience of the user. In the present embodiment, focus is on accelerating the detection of a communication malfunction in response to an activation of the MFP.

Figure 4:
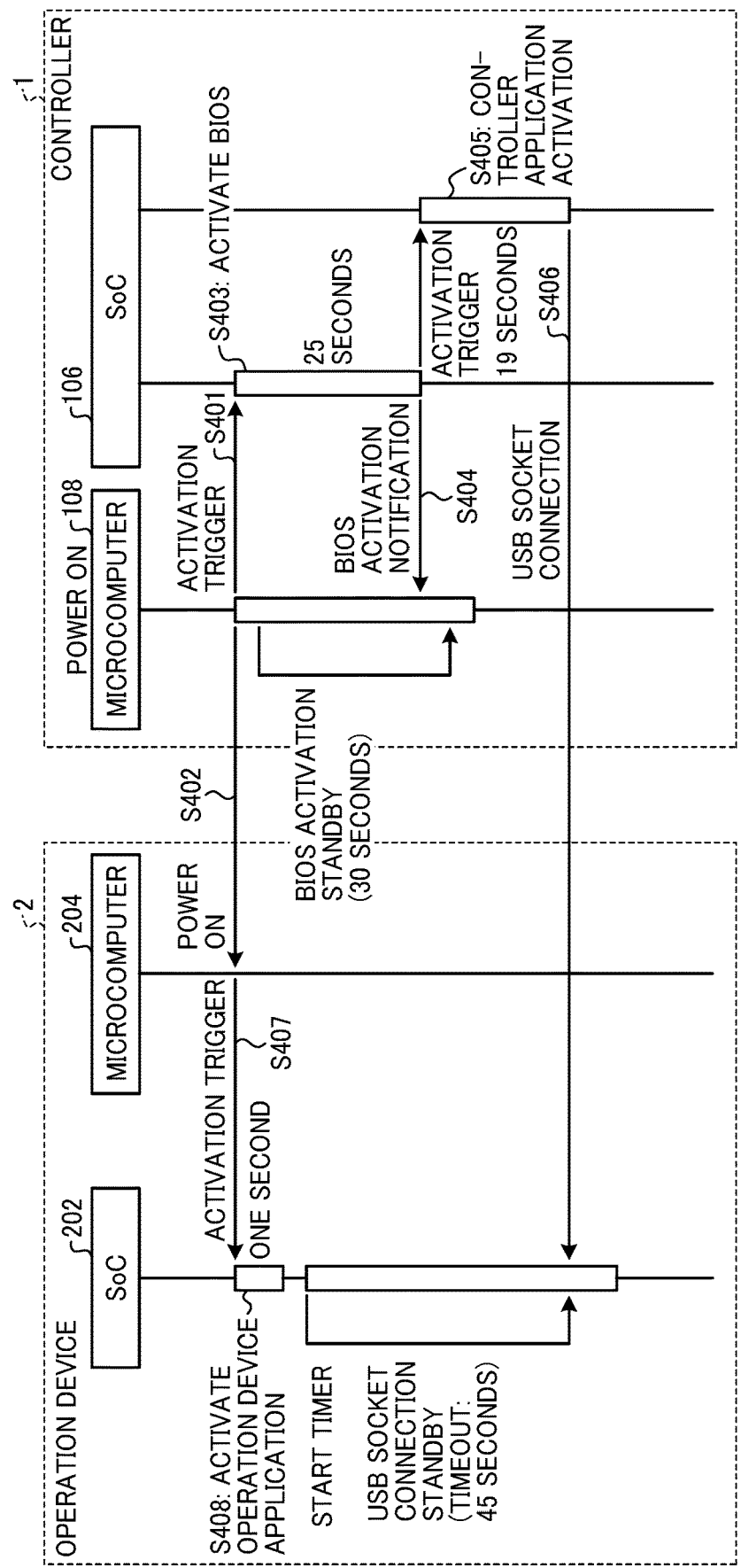
FIG. 4 is a sequence diagram illustrating an example of a process executed by the MFP according to the embodiments of the present disclosure from power-on until data communication is established without implementing minimization of malfunction detection time.
Figure 5:
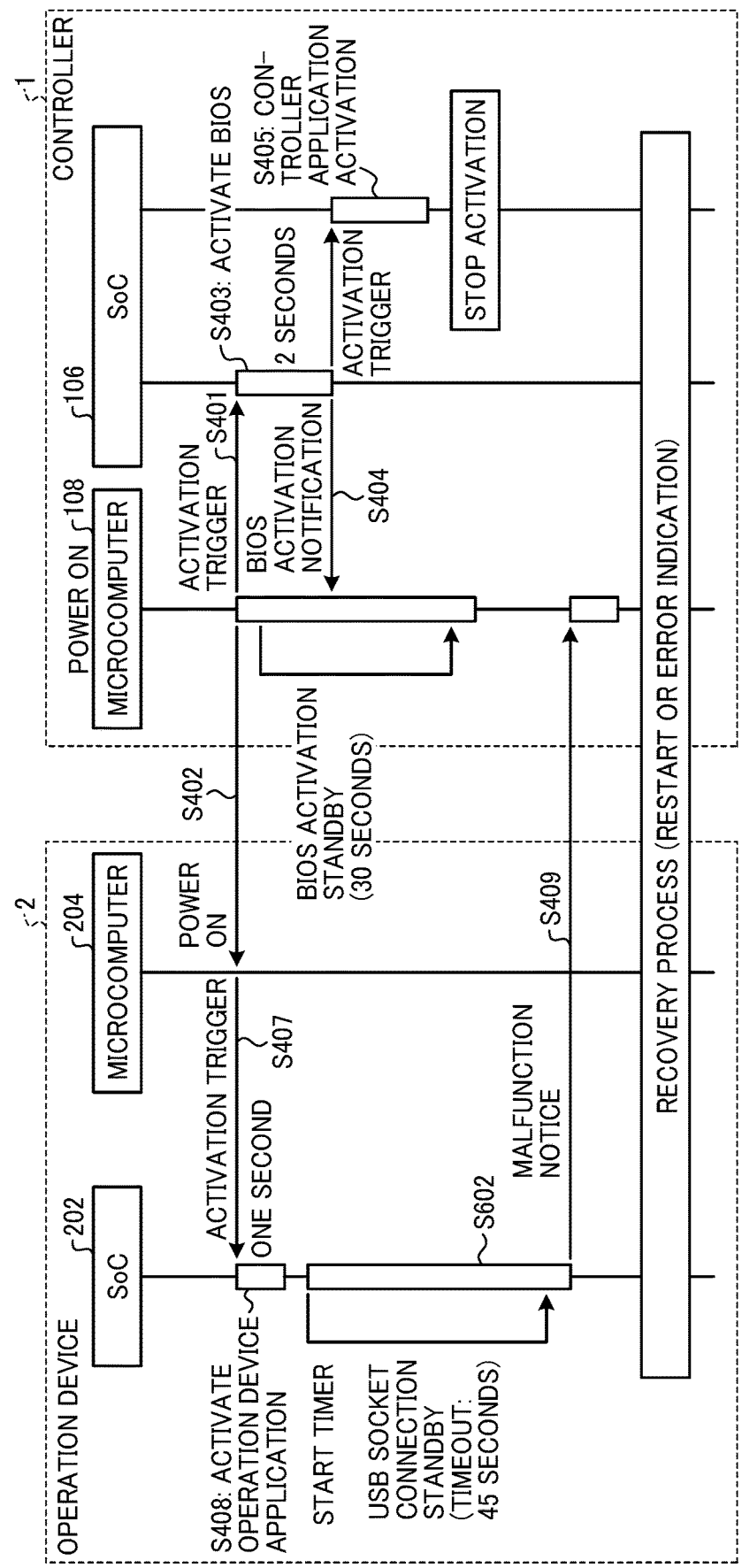
FIG. 5 is a sequence diagram illustrating an example of a process executed by the MFP according to the embodiments of the present disclosure from power-on until performing a recovery process without implementing the minimization of malfunction detection time.

FIG. 4 is a sequence diagram illustrating an example of a process executed by the MFP according to the embodiments of the present disclosure from power-on until establishment of the data communication without implementing minimization of malfunction detection time. FIG. 5 is a sequence diagram illustrating an example of a process executed by the MFP according to the embodiments of the present disclosure from power-on until performing a recovery process without implementing the minimization of malfunction detection time. According to the MFP of the present embodiment, after power is turned on, the microcomputer 108 of the controller 1 outputs an activation trigger to the SoC 106 in step S401, and further turns on the power of the microcomputer 204 of the operation device 2 in step S402.

In step S403, the SoC 106 of the controller 1 activates the BIOS in response to input of the activation trigger from the microcomputer 108. The microcomputer 108 waits for the BIOS to activate. In response to the activation of the BIOS, the SoC 106 notifies the microcomputer 108 of the BIOS activation in step S404, and activates an application (for example, SCS) in the controller 1 in step S405. In response to the activation of the application in the controller 1, the SoC 106 connects the USB socket in step S406. In other words, the SoC 106 performs data communication with the operation device 2 through the USB cable 208 in step S406.

After the power is turned on, the microcomputer 204 of the operation device 2 outputs an activation trigger to the SoC 202 in step S407. In response to input of the activation trigger from the microcomputer 204, the SoC 202 activates an application (for example, LUI) in the operation device 2 in step S408 and waits for the USB socket to be connected to the controller 1. In other words, the SoC 202 waits until communication with the controller 1 through the USB cable 208 is available.

When performing data communication through the USB cable 208, the SoC 202 starts a malfunction detection timer and determines whether data communication is available with the controller 1 through the USB cable 208. Then, as illustrated in FIG. 5, the SoC 202 determines that the controller 1 is malfunctioning when the data communication is not available and the malfunction detection timer reaches or exceeds a preset value. In the following description, the time counted by the malfunction detection timer, which serves as a criterion for the determination of malfunction, is defined as timeout period. Here, the timing for starting the malfunction detection timer is when the application in the operation device 2 has completed activation.

Regarding the activation of the controller 1, variation exists in the time taken to complete the activation of the BIOS. This is because complementary metal-oxide semiconductor (CMOS) is to be cleared for recovery after the first start-up or after an error occurs, and the entire BIOS is to be read again when the BIOS inside the SoC 106 is started from the cleared state.

As illustrated in FIG. 4, the timeout period is set to a longer fixed value, for example, 45 seconds, assuming startup after clearing the CMOS (for example, 25 seconds) where the BIOS startup time is the longest. As illustrated in FIG. 3, although a malfunction occurred in the controller 1 within a fixed time (timeout period), in step S4, determination may be made that there is no malfunction in the controller 1 because the fixed time period is not exceeded, the process returns to steps S2 and S3 and extra time is taken to confirm the data communication and to determine that the malfunction has occurred. As illustrated in FIG. 5, the SoC 202 of the operation device 2 detects a malfunction of the controller 1 after the fixed timeout period (for example, 45 seconds) has passed, and a notification of the malfunction is sent to the microcomputer 108 of the controller 1 in step S409.

Figure 6:
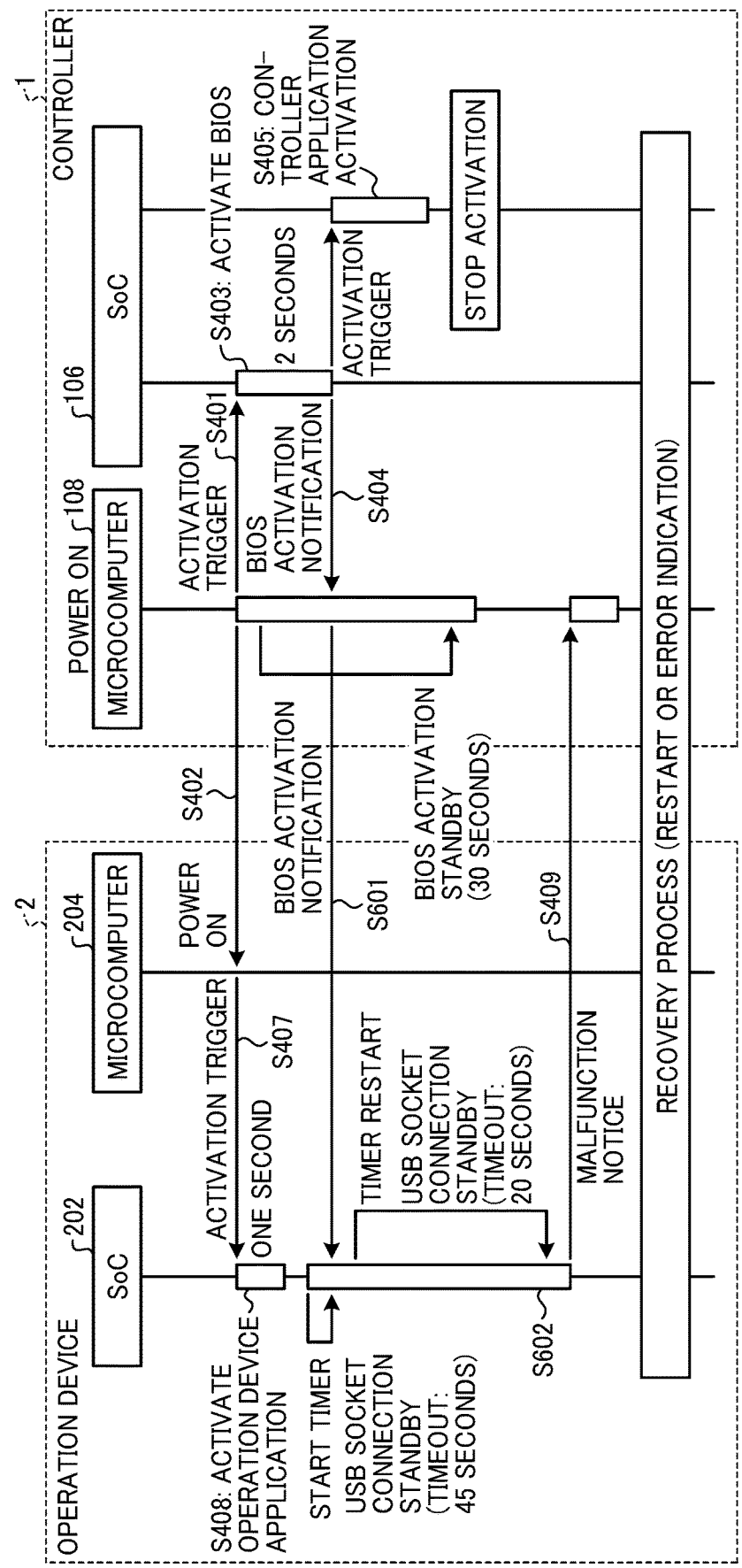
FIG. 6 is a sequence diagram illustrating an example of a process executed by the MFP according to the embodiments of the present disclosure from power-on until performing a recovery process with the minimization of malfunction detection time implemented.

FIG. 6 is a sequence diagram illustrating an example of a process executed by the MFP according to the embodiments of the present disclosure from power-on until performing the recovery process with the minimization of malfunction detection time implemented. As described above, in the MFP according to the present embodiment in FIG. 5, after the BIOS is activated without problem (for example, in two seconds), despite a malfunction that the application in the controller 1 stopped activation, the SoC 202 of the operation device 2 is not able to detect the malfunction occurred in the controller 1 until the fixed timeout period (for example, 45 seconds) elapses while waiting for the USB socket to be connected.

On the other hand, in the MFP according to the present embodiment, as illustrated in FIG. 6, in response to the notification of the completion of BIOS startup from SoC 106, the microcomputer 108 of the controller 1 notifies the SoC 202 (an application in the operation device 2) of the operation device 2 of the completion of BIOS activation in step S601. The SoC 202 of the operation device 2 (an application in the operation device 2) starts the malfunction detection timer with the fixed timeout period (initial value, for example 45 seconds) at activation in the same way as when the minimization of malfunction detection time is implemented, but when the controller 1 notifies the completion of BIOS activation, the timeout period is updated to a shorter period of time (for example, 20 seconds) than the initial value (for example, 45 seconds), and the malfunction detection timer is restarted in step S602. Here, 20 seconds is preferably the maximum time from BIOS activation to connection of the USB socket. As a result, in the case the USB socket is not connected within 20 seconds, the SoC 202 determines that there is a malfunction (failure of the controller 1) at that time.

In the case the minimization of malfunction detection time is not achieved in the MFP according to the present embodiment, until the malfunction of the controller 1 is detected, a total of 46 seconds from power-on to activation of the application in the operation device 2 (for example, 1 second) and timeout period (for example, 45 seconds) is to be waited. On the other hand, according to the MFP of the present embodiment with the minimization of malfunction detection time implemented, the time to determine the malfunction of the operation device 2 is shortened by 24 seconds which is a reduction of total 22 seconds including normal activation time of BIOS from power-on (for example, 2 seconds) and the timeout period (for example, 20 seconds).

As described above, the MFP according to the present embodiment minimizes the time to detect the malfunction in the operation device 2.

The program executed by the MFP of the present embodiment is preinstalled and provided in the ROMs 104, 203, and the like. The program executed by the MFP according to the present embodiment may be stored in a computer readable storage medium, such as a compact disc read only memory (CD-ROM), a flexible disk (FD), a compact disc recordable (CD-R), and a digital versatile disc (DVD), in an installable or executable file format for distribution.

Furthermore, the program executed by the MFP according to each embodiment can be stored in a computer connected to a network such as the internet and downloaded through the network. Further, the program executed by the MFP according to each embodiment can be provided or distributed through a network such as the internet.

The program executed by the MFP of the present embodiment has a module configuration including the above-described units (detection unit, restart unit, and the like). As actual hardware, processors such as the CPUs 101 and 201 of the SoCs 106 and 202 read and execute programs stored in the ROMs 104 and 203, thereby loading the above units onto the main storage device and forming the detection unit, restart unit, and the like are generated on the main storage device.

In the above described embodiments, examples in which the image forming apparatus of the present disclosure is applied to the MFP including at least two functions out of a copy function, a print function, a scan function and a facsimile function are described, but the present disclosure can be applied to any image forming apparatus such as copiers, printers, scanners, facsimiles, and the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising a controller and an operation device communicably connected to each other through a communication path, the controller including circuitry configured to, in response to completion of a specific software activation process in the controller, transmit an activation completion notification to the operation device, and the operation device including circuitry configured to:

in response to receiving the activation completion notification, update a timeout period of a timer started after activation of software of the operation device to a shorter period of time and restart the timer; and in a case where data communication is not established on the communication path within the updated timeout period, detect a malfunction and notify the controller of the malfunction; and the circuitry of the controller is configured to perform a recovery process.

2. The information processing apparatus of claim 1 wherein the circuitry of the controller includes first circuitry and second circuitry, the first circuitry being configured to notify the second circuitry of the completion of activation of the specific software of the controller, and the second circuitry being configured to transmit the activation completion notification to the circuitry of the operation device, in response to the notification from the first circuitry.

3. An image forming apparatus comprising:

the information processing apparatus of claim 1; and an image forming device that forms an image processed by the information processing apparatus.

4. An information processing method executed by an information processing apparatus comprising a controller and an operation device, the method comprising:

with the controller, in response to completion of specific software activation process in the controller, transmitting an activation completion notification to the operation device;

with the operation device, in response to receiving the activation completion notification, updating a timeout period of a timer started after activation of software of the operation device to a shorter period of time, and restarting the timer; and in a case where data communication is not established on a communication path between the controller and the operation device within the updated timeout period, detecting a malfunction and notifying the controller of the malfunction; and with the controller, performing a recovery process.

5. The information processing method of claim 4 wherein the controller includes first circuitry and second circuitry, the method further comprises:

with the first circuitry, notifying the second circuitry of the completion of activation of the specific software of the controller, and the transmitting comprises transmitting, with the second circuitry, the activation completion notification to the operation device in response to the notification from the first circuitry.

6. A non-transitory recording medium storing a plurality of instructions which, when executed by one or more processors on an information processing apparatus comprising a controller and an operation device, causes the processors to perform an information processing method, including:

with the controller, in response to completion of specific software activation process in the controller, transmitting an activation completion notification to the operation device;

with the operation device, in response to receiving the activation completion notification, updating a timeout period of a timer started after activation of software of the operation device to a shorter period of time, and restarting the timer; and in a case where data communication is not established on a communication path between the controller and the operation device within the updated timeout period, detecting a malfunction and notifying the controller of the malfunction; and with the controller, performing a recovery process.

* * * * *